(12) United States Patent
Kwok et al.

(10) Patent No.: US 11,564,159 B2
(45) Date of Patent: Jan. 24, 2023

(54) ORCHESTRATION AND MEDIATION STACK

(71) Applicant: T-Mobile USA, Inc., Bellevue, WA (US)

(72) Inventors: Ming Shan Kwok, Seattle, WA (US); Hang Hoi Yau, Sammamish, WA (US); Syed Toaha Ahmad, Renton, WA (US); Wafik Abdel Shahid, Kenmore, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 13 days.

(21) Appl. No.: 17/164,183

(22) Filed: Feb. 1, 2021

(65) Prior Publication Data
US 2022/0248311 A1 Aug. 4, 2022

(51) Int. Cl.
*H04W 48/18* (2009.01)
*H04W 28/16* (2009.01)
*H04L 41/0893* (2022.01)
*H04W 84/04* (2009.01)

(52) U.S. Cl.
CPC ........ *H04W 48/18* (2013.01); *H04L 41/0893* (2013.01); *H04W 28/16* (2013.01); *H04W 84/042* (2013.01)

(58) Field of Classification Search
CPC ... H04W 48/18; H04W 28/16; H04W 84/042; H04L 41/0893; H04L 41/0894
See application file for complete search history.

(56) References Cited

U.S. PATENT DOCUMENTS

| 11,071,055 | B1* | 7/2021 | Wang | H04W 48/18 |
| 11,310,733 | B1* | 4/2022 | Gupta | H04W 28/0268 |
| 2017/0257886 | A1 | 9/2017 | Adjakple et al. | |
| 2018/0332441 | A1* | 11/2018 | Shaw | H04W 4/70 |
| 2019/0140904 | A1 | 5/2019 | Huang et al. | |
| 2020/0052991 | A1* | 2/2020 | Kodaypak | H04L 47/801 |

(Continued)

FOREIGN PATENT DOCUMENTS

| KR | 102108878 B1 | 5/2020 |
| KR | 1020200079352 A | 7/2020 |

OTHER PUBLICATIONS

Multi-Acess Edge Computing (MEC): Framework and Reference Architecture. ETSI GS MEC 003 V2.1.1 [online]. ETSI, Jan. 2019 [retrieved on Dec. 4, 2020]. Retrieved from the Internet: <URL: https://www.etsi.org/deliver/etsi_gs/MEC/001_099/003/02.01.01_60/gs_MEC003v020101p.pdf>.

(Continued)

*Primary Examiner* — Marcus Hammonds
(74) *Attorney, Agent, or Firm* — Han Santos, PLLC

(57) ABSTRACT

An orchestration and mediation (O/M) stack to be installed in a user device that subscribes to a carrier system is provided. The O/M stack configures the user device to receive a policy for accessing a plurality of different network slices that are logical networks virtualized on a physical infrastructure of the carrier system. The O/M stack configures the user device to coordinate each application's access to different services provided by the plurality of different network slices. An application is allowed access to a particular network slice when the application and the user device meet a condition specified by the received policy for accessing the particular network slice.

20 Claims, 5 Drawing Sheets

(56) References Cited

U.S. PATENT DOCUMENTS

| | | | |
|---|---|---|---|
| 2020/0059856 A1* | 2/2020 | Cui | H04W 24/02 |
| 2020/0068074 A1* | 2/2020 | Cai | H04M 15/66 |
| 2020/0313959 A1* | 10/2020 | Higuchi | H04W 48/18 |
| 2020/0337050 A1 | 10/2020 | Mildh | |
| 2021/0136674 A1* | 5/2021 | Lee | H04W 48/18 |
| 2021/0185601 A1* | 6/2021 | Altay | H04L 47/805 |
| 2021/0204164 A1* | 7/2021 | Yavuz | H04L 47/781 |
| 2021/0306939 A1* | 9/2021 | Zhang | H04W 40/32 |
| 2022/0191303 A1* | 6/2022 | Gupta | H04L 67/10 |

OTHER PUBLICATIONS

How is 5G Slicing different from QoS [online]. 5G World Pro.com, Jan. 24, 2019 [retrieved on Jan. 31, 2021]. Retreived from the Internet: <URL: https://www.5gworldpro.com/5g-knowledge/102-5g-how-is-5g-slicing-different-from-qos.html>.

Saboorian, Tony and Amanda Xiang. Network Slicing and 3GPP Service and Systems Aspects (SA) Standard [online]. IEEE, Dec. 2017 [retrieved on Jan. 31, 2021]. Retrieved from the Internet: <URL: https://sdn.ieee.org/newsletter/december-2017/network-slicing-and-3gpp-service-and-systems-aspects-sa-standard>.

International Patent Application No. PCT/US2022/014581, International Search Report and Written Opinion dated May 10, 2022, 11 pages.

\* cited by examiner

ORCHESTRATION AND MEDIATION STACK

BACKGROUND

The fifth generation technology standard (5G) for broadband cellular networks is the planned successor to the Long-Term Evolution (LTE or 4G) networks which provide connectivity to most current cellphones. 5G wireless devices in a cell (small geographic area) are connected to the Internet and a telephone network by radio waves through a local antenna in the cell. 5G networks have significantly greater data bandwidth to also serve as general Internet Service Providers (ISPs) for laptops and desktop computers, thus making new applications such as Internet of Things (IoT) and machine-to-machine areas possible.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

This disclosure is directed to systems and techniques that provide an application orchestration and mediation stack to be implemented at a user device or user equipment (UE). The orchestration and mediation stack coordinates the operations of the applications running at the UE and of the physical network access (e.g., low level modem) of the UE. The orchestration and mediation stack may support new applications and use cases of newer telecommunications standards such as 5G.

For example, a 5G carrier system may support multiple different network slices for providing services to one or more subscribing UEs. Each network slice is a logical network that is virtualized on the carrier system. Each network slice is specified for a particular type of applications having specific Quality of Service (QoS). The carrier system provides (pushes, delivers) network access policies to subscribing UEs. The orchestration and mediation stack of a UE enables an application running on the UE to access a particular network slice when the application and the UE meet the conditions specified by the policy provided by the carrier system. As another example, a 5G carrier system may provide edge computing resources close to the UE, and the orchestration and mediation stack reports the status of the UE to an edge computing resource so the edge computing resource may be instructed to adjust to meet the service level requirement for the UE.

Figure 1:
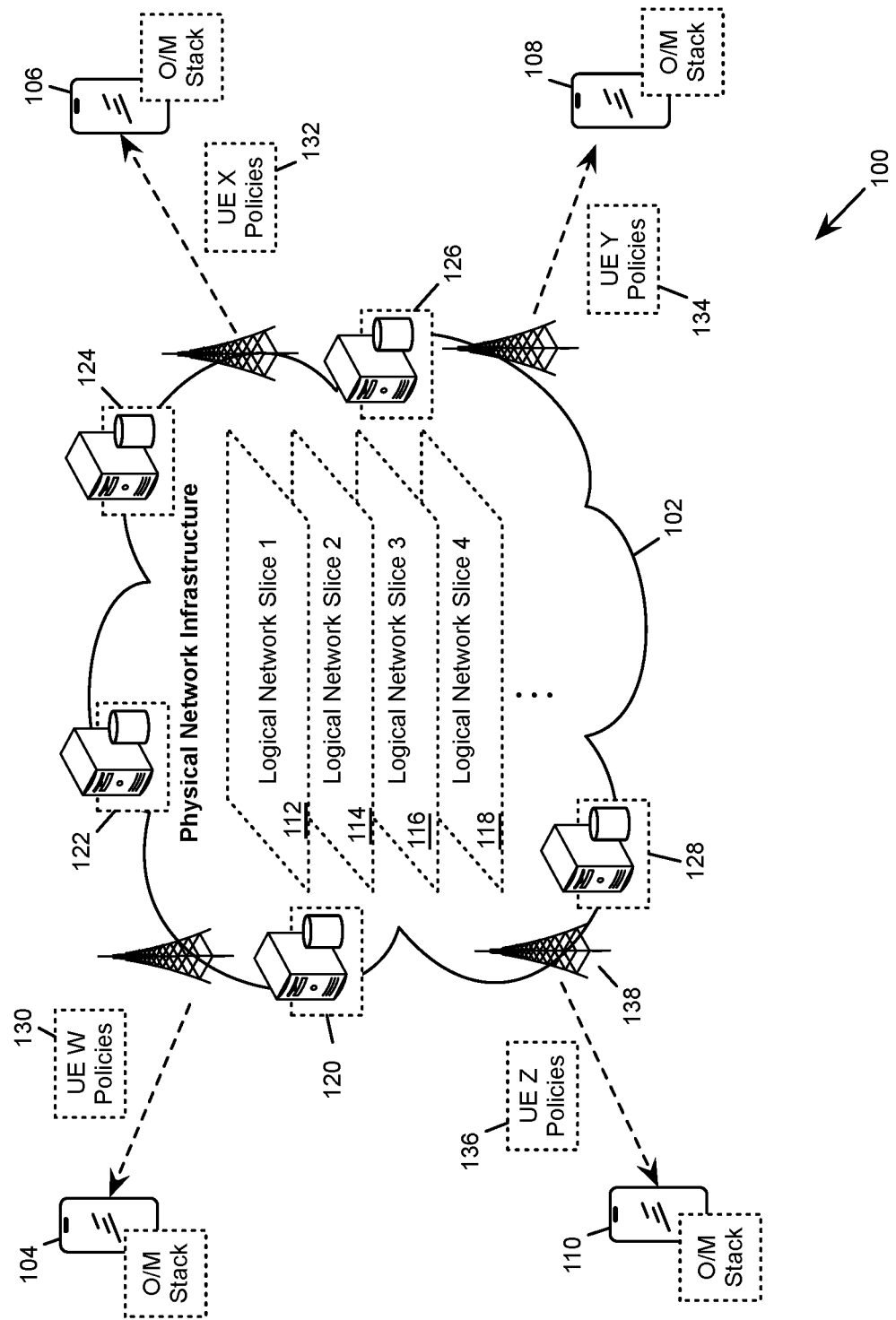
FIG. 1 conceptually illustrates user devices having orchestration and mediation (O/M) stacks that facilitates certain features of a telecommunications carrier system.

FIG. 1 conceptually illustrates UEs having orchestration and mediation stacks that facilitates certain features of a telecommunications carrier system 100. The carrier system 100 is implemented over a physical infrastructure 102 that provides a data network access to several UEs 104, 106, 108, and 110. The UEs subscribe to the services of the carrier system 100 and are in communication with the system. The carrier system 100 implements several logical network slices 112, 114, 116, and 118 over the physical infrastructure 102. The physical infrastructure 102 also provides low-latency edge computing resources 120, 122, 124, 126, and 128 to subscribing UEs (e.g., 104-110).

The carrier system 100 is a network system of a telecommunications service provider that provide cellular telephone service and/or broadband data communications services. The carrier system 100 allows wireless devices in a cell (a geographical division of the service area) to be connected to the Internet and/or a telephone network by radio waves through a local antenna in the cell. The carrier system not only serves cell phones, but may also serves as a general Internet service provider for laptops and desktop computers, and also make possible new applications in Internet of Things (IoT) and machine-to-machine areas. The carrier system 100 may provide telecommunications services based on or in compliance with one or more specific technology standards, such as Long Term Evolution (LTE or 4G) or fifth generation (5G) technology standard for broadband cellular networks. The new 5G standard provides greater bandwidth and higher download speed.

The physical infrastructure 102 refers to the hardware devices and connections upon which the carrier system 100 is implemented. The physical infrastructure 102 may include the core network of the carrier system 100, which in turn may include routers, switches, or other types of data forwarding elements for conducting data traffic (e.g., packet traffic) between various network endpoints such as user devices, base stations, hotspots, and other types of computing and communications resources. The core network also provides access to external networks such as the Internet. The core network may include components that provide services to the subscribers of the cellular network and track positions of the user devices. The core network may include a packet network, e.g., an Evolved Packet Core (EPC) that interconnects different components belonging to an Evolved Packet System (EPS). EPC is a framework for providing converged voice and data on a 4G Long Term Evolution (LTE) network. EPC unifies voice and data on an Internet Protocol (IP) service architecture. The EPC allows the operator of the cellular network to deploy and operate one packet network for 2G, 3G, 4G, 5G, wireless local area network (WLAN), and fixed access such as Ethernet, Digital Subscriber Line (DSL), cable, and fiber.

The physical infrastructure 102 may connects multiple clients with multiple servers of various applications. The network may include one or more middleboxes that interconnect multiple clients with multiple servers. The clients may include one or more user devices and/or one or more IoT devices. The servers of the application 100 may include backend application server instances. Each server may be a general-purpose computer, such as a desktop computer, tablet computer, laptop computer, server, or an electronic device that is capable of receiving inputs, processing the inputs, and generating output data. Each server may also be a virtual computing device such as a virtual machine or a software container that is hosted in a cloud. Each server may also be implemented by multiple computing devices, virtual machines, software containers, and/or so forth.

Each of the user devices or UEs 104-110 may be a smartphone, a smartwatch, a personal digital assistant (PDA), a desktop computer, a laptop computer, a tablet computer, or any other computing device or mobile device that can communicate with other devices via the carrier system 100. More specifically, the carrier system 100 is equipped with radio access networks (RANs) and/or wireless local area networks (WLANs) that provide wireless connectivity to wireless user devices such as wireless handsets or smartphones.

The network slices 112-118 are virtual independent logical networks that multiplex on the same physical network infrastructure 102. Network slicing is similar to software-defined networking (SDN) and network function virtualization (NFV) that allow the implementation of flexible and scalable network slices on top of a common network infrastructure. Each network slice is an isolated end-to-end network tailored to fulfil a specific set of requirements (e.g., service level requirement SLR or quality of service QoS) requested by a particular application.

At least some of the network slices may be administrated by one or more mobile virtual network operators (MVN0s). The provider of the physical infrastructure 102 may lease its physical resources to the MVNOs that share the underlying physical network. A MVNO may, according to the availability of the physical resources assigned to it, autonomously deploy multiple network slices that are customized to the various applications provided to the MVNO's users.

The edge computing resources 120-128 refer to functions or resources for processing, storage, and/or networking that are at the network edge and are physically or communicatively close to the end-user endpoints or devices. In the example of FIG. 1, the edge computing resource 120 is close to the UE 104, the edge computing resource 124 is close to the UE 106, the edge computing resource 126 is close to the UE 108, and the edge computing resource 128 is close to the UE 110. For example, edge computing resource 128 has very little delay from a base station 138 that is in radio communications with the UE 110. Computational capabilities can be decentralized (e.g., not concentrated in a primary data center) and distributed to resources located on edges, such as mobile broadband antennas, CPEs, branch routers, and even terminals. This allows the carrier system 100 to provide at least some of its services at lower latencies to the UEs 104-110.

Each of the subscribing UEs 104-110 operates an orchestration and mediation (O/M) stack that facilitates the UE's use of the features of the carrier system 100, such as network slicing and/or edge computing. In some embodiments, a O/M stack installed on a UE coordinates each application's access to the capabilities of underlying the physical devices of the UE and to the different services provided by the different network slices 112-118. For some embodiments, orchestration refers to automated execution of workflows, while mediation refers to integration of different applications and service components.

In some embodiments, a subscriber UE may receive a set of policies (or policy updates) that are pushed by the carrier system. The set of policies specifies the conditions by which the applications running on the UE may access certain network slices that are associated with certain services. Specifically, the O/M stack of the UE may determine whether an application running on the UE may access a particular network slice by matching a condition of the device with that specified by the received set of policies. For example, a condition may specify that only an application having a particular identifier may access a particular service or network slice, or that the applications running on the UE may only use certain network slices based on the subscriber's service level requirement with the carrier system 100.

In the example of FIG. 1, the carrier system 100 pushes a set of policies 130 to the UE 104, a set of policies 132 to the UE 106, a set of policies 134 to the UE 108, and a set of policies 136 to the UE 110. In some embodiments, the set of policies being pushed to a UE may be determined according the agreement between the carrier system and the subscriber using the UE, and is therefore specific to the UE. In some embodiments, the set of policies are universal for all UEs, and it is up to individual UEs to determine whether the conditions set forth in the policies are satisfied for accessing any particular network slice.

Figure 2:
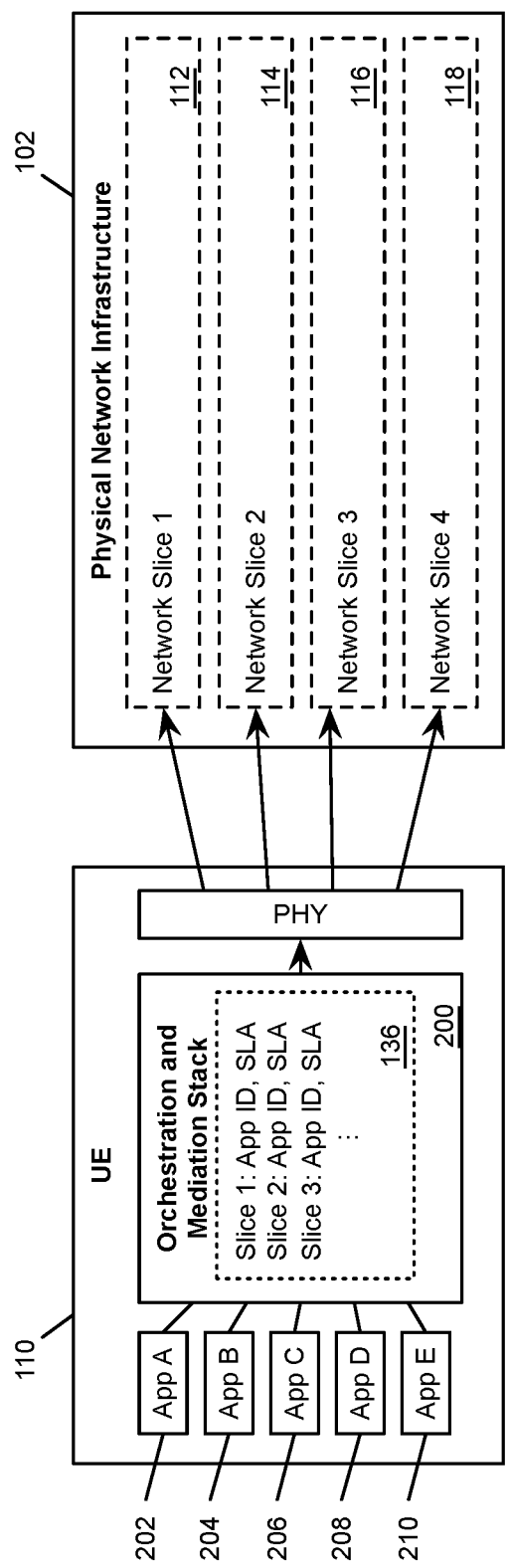
FIG. 2 conceptually illustrates a user device having an O/M stack that coordinates the access of different network slices based on policies received from the carrier system.

FIG. 2 conceptually illustrates a UE having an O/M stack that coordinates the access of different network slices based on policies received from the carrier system. As illustrated, the UE 110 is operating a O/M stack 200. The UE 110 is alsooperating applications 202, 204, 206, 208, and 210 (labeled A, B, C, D, and E, respectively.) The O/M stack conducts the operations that allow each of the applications 202-210 to use the hardware of the UE 110 (e.g., networking chipsets) and have access to one or more of the network slices 112-118.

Whether an application running on the UE 110 is allowed to access a particular network slice is determined at least partially according to the policies 136 that are received from the carrier system 100. The policies 136 are used to determine whether any of the applications 202-210 running on the UE 110 may access any of the network slices 112-118. In some embodiments, each network slice has a corresponding policy for determining whether an application running on the UE is allowed to access the network slice, such that each of the network slices 112-118 may have a corresponding policy in the set of polices 136.

The O/M Stack 200 implements slicing support, which uses application identifiers specified in the received network policies to routes application traffic to specific network slices. In some embodiments, the policies 136 are specified as UE Route Selection Policy (URSP) that is used to direct network traffic on different Radio Access Technology (RAT). The UE 110 can be provisioned with URSP information, the provisioning triggering the establishment of a new Protocol Data Unit (PDU) session on a network slice that a given service or application should use when the PDU is activated. In addition, the O/M stack 200 may select network slices according to a set of network slicing selection assistance information (NSSAI), which provide specific network slicing information and expected behavior. NS SAI can be exchanged with the carrier system 100 through a 5G attach/register procedure.

For example, to carry out a particular operation for Application 204 (App B), the O/M stack 200 may use the policies 136 to identify the network slice 116 as the network slice to use to reach a particular service required by the Application 204. The policies 136 may also specify that only applications having a particular application identifier are allowed to access the network slice 116, and the O/M 200 would check to see if the application 204 has that particular application identifier before executing operations to send data traffic from the application 204 to the network slice 116.

The policies may also specify that only a UE with a SLR above a threshold QoS may access the network slice 116, and the O/M stack 200 of the UE 110 allows the application 204 to use the network slice 116 only if the SLR of the UE 110 is above the threshold QoS. The policy may further specify other limitations, such as specific time frames that the UE 110 is allowed to use the network slice 116.

As mentioned, the carrier system 100 may provide edge computing capabilities that can be used to minimize latencies of UEs accessing the carrier system's network. Edge computing allows data processing and other operations to occur as close as possible to the edge to enable near-real-time responses to the UEs. In some embodiments, the O/M stack 200 reports the status of the UE 110 to an edge computing resource so the edge computing resource may be configured to meet the service level requirement for the UE 110.

Figure 3:
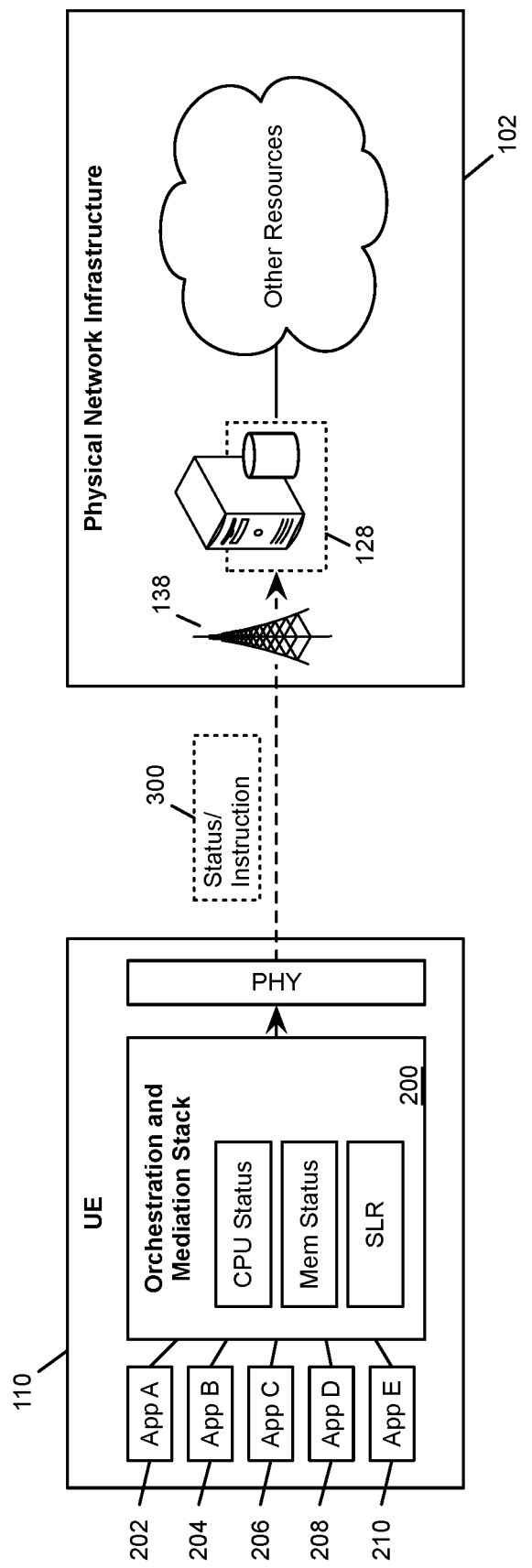
FIG. 3 conceptually illustrates edge computing resources being configured to meet the service level requirement of a user device.

FIG. 3 conceptually illustrates edge computing resources being configured to meet the SLR of a UE. As illustrated, the O/M 200 of the UE 100 monitors the operations taking place in UE 110 and communicates the monitored result as a status message 300 to the edge computing resource 128. The monitored result may include information such as CPU usage, memory usage, upcoming server access, upcoming network usage, service level requirement, etc. of the UE 110. The edge computing resource 128 is in turn configured based on the status message 300 so it can meet the service level requirement of the UE 110 by e.g., allocating or releasing computing resources and/or storage, prefetch data blocks from certain servers, etc.

Figure 4:
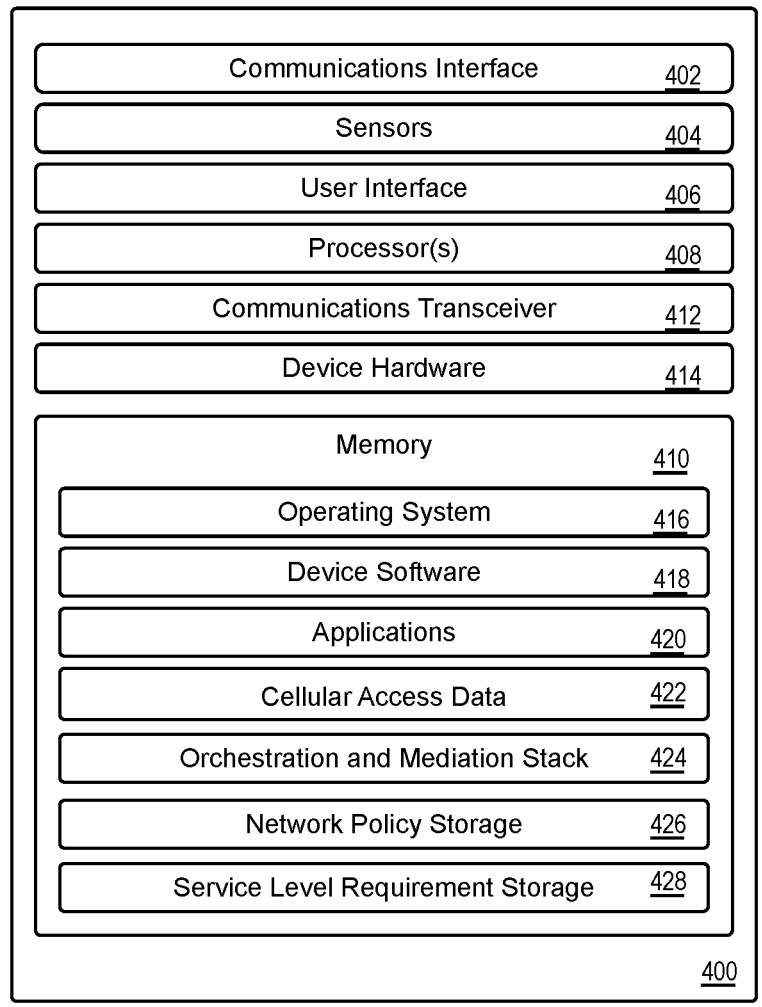
FIG. 4 is a block diagram showing various components of an example user device that is installed an orchestration and mediation stack for using network slicing and edge computing.

FIG. 4 is a block diagram showing various components of an example user device 400 that is installed an orchestration and mediation stack for using network slicing and edge computing. The user device 400 can be a user equipment (e.g., the UE 110) using a cellular network of the carrier system 100.

The user device 400 may include a communications interface 402, one or more sensors 404, a user interface 406, one or more processors 408, and memory 410. The communications interface 402 may include wireless and/or wired communication components that enable the user device 400 to transmit or receive voice or data communication over cellular networks and/or WiFi networks.

The sensors 404 may include a proximity sensor, a compass, an accelerometer, altimeter, cameras, and/or a global positioning system (GPS) sensor. The proximity sensor may detect movement of objects that are proximate to the user device 400. The compass, the accelerometer, and the GPS sensor may detect orientation, movement, and geolocation of the user device 400.

The user interface 406 may enable a user to provide inputs and receive outputs from the user device 400. The user interface 406 may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods.

The memory 410 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital optical disks or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The user device 400 may also include communications transceivers 412 and other device hardware 414. The communication transceivers are hardware components that enable the user device 400 to perform telecommunication and data communication with the multiple communication networks. The device hardware 414 may include other hardware that is typically located in a mobile telecommunication device. For example, the device hardware 414 may include signal converters, transceivers, antennas, hardware decoders and encoders, graphic processors, a SIM card slot, and/or the like that enable the user device 400 to execute applications and provide telecommunication and data communication functions. An integrated circuit chip such as a SIM may be inserted into the SIM card slot of the user device 400. Alternatively, an embedded SIM may be hard-wired into the circuit board of the user device 400.

The one or more processors 408 and the memory 410 of the user device 400 may implement an operating system 416, device software 418, one or more applications 420, a set of cellular access data 422, and an orchestration and mediation stack 424. The memory 410 also includes a network policy storage 426 and a service level requirement storage 428.

The various software and applications may include routines, program instructions, objects, and/or data structures that perform particular tasks or implement particular abstract data types. The operating system 416 may include components that enable the user device 400 to receive and transmit data via various interfaces (e.g., user controls, communications interface 402, and/or memory input/output devices). The operating system 416 may also process data using the one or more processors 408 to generate outputs based on inputs that are received via the user interface 406. For example, the operating system 416 may provide an execution environment for the execution of the applications 420. The operating system 416 may include a presentation component that presents the output (e.g., display the data on an electronic display, store the data in memory, transmit the data to another electronic device, etc.).

The operating system 416 may include an interface layer that enables applications to interface with the communications transceivers 412 and/or the communications interface 402. The interface layer may comprise public APIs, private APIs, or a combination of both public APIs and private APIs. Additionally, the operating system 416 may include other components that perform various other functions generally associated with an operating system.

The device software 418 may include software components that enable the user device 400 to perform functions. For example, the device software 418 may include basic input/output system (BIOS), Boot ROM, or a bootloader that boots up the user device 400 and executes the operating system 416 following power up of the device.

The applications 420 may include applications that provide utility, entertainment, and/or productivity functionalities to a user of the user device 400. The applications 420 may further include electronic mail applications, remote desktop applications, web browser applications, navigation applications, office productivity applications, multimedia streaming applications, and/or so forth. The cellular access data 422 may store credentials for accessing 2G, 3G, 4G, or 5G networks.

The orchestration and mediation (O/M) stack 424 include programs at different layers of device operational hierarchy (from applications to physical circuits.) The O/M stack may be provided by the carrier system to be downloaded and installed on the UE 400. The O/M stack translates high level application instructions from the and data (from the applications 420) into low level physical circuit signals, including coordinating each application's access to the capabilities of underlying the physical devices and to the different services provided by the different network slices. For example, the O/M stack 424 may select a network slice based on a request from an application and controls the communications interface 402 to carry out the necessary handshake with the carrier system 100 to allow the data traffic between the network slice and the application.

The O/M stack 424 allows an application access to a particular network slice when the application and the user device meet a condition specified by policies for accessing the particular network slice, and the O/M stack may match the condition specified by the policies for accessing the particular network slice with a condition of the device. The conditions being examined by the O/M stack may include usage metrics of processing units or storage, or an identity of the application, or a service level requirement between the subscriber using the user device and the carrier, etc. The policies may be pushed by the carrier system 100 to the UE 400 through the communications interface 402. The received policies are then stored in the network policy storage 426 to be used by the O/M stack 424. The service level requirement of the subscriber and the carrier system 100 may be stored in the service level requirement storage 428. The O/M stack 424 also monitors and reports the status of the UE 400 to an edge computing resource of the carrier system 100 so the edge computing resource may be configured to meet the service level requirement of the UE 400.

Figure 5:
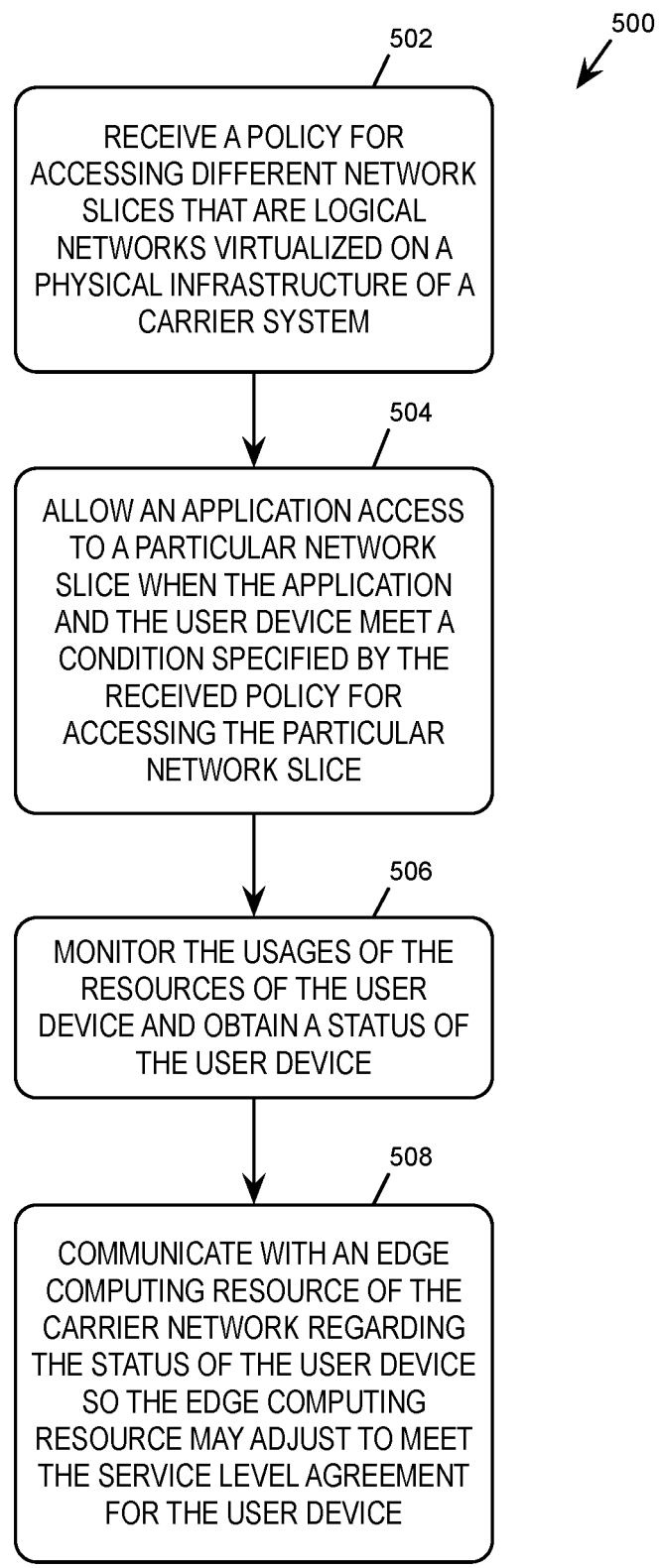
FIG. 5 conceptually illustrates a flow diagram of an example process performed by a user device for utilizing network slicing and edge computing features of a carrier system.

FIG. 5 conceptually illustrates a flow diagram of an example process 500 performed by a UE for utilizing network slicing and edge computing features of a carrier system. In some embodiments, the UE operates an orchestration and mediation stack coordinating the access to network slices and communicating with edge computing resources.

The process 500 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like, that perform particular functions or implement particular abstract data types. The order in which the operations are described is not intended to be construed as a limitation, and any number of the described blocks can be combined in any order and/or in parallel to implement the process.

At block 502, the UE receives a policy (or policy update) for accessing multiple different network slices that are logical networks virtualized on a physical infrastructure of the carrier system. In some embodiments, the policy for accessing a network slice by applications of a user device is specified based on a service level requirement of the network slice. In some embodiments, the policy for accessing a network slice by an application of a user device is specified based on a quality of service assigned to a subscriber associated with the user device. In some embodiments, the received policy is in URSP format, and is used to direct traffic on different RAT, QoS. The receipt of URSP policy also trigger establishment of a new PDU session.

At block 504, the UE allows an application access to a particular network slice when the application and the user device meet one or more condition(s) specified by the received policy for accessing the particular network slice. More generally, the UE coordinates each application's access to the capabilities of underlying the physical devices and to the different services provided by the different network slices. In some embodiments, the UE matches the condition(s) specified by the policy for accessing the particular network slice with a condition of the device, or an identity of the application, or a service level agreement between the subscriber using the user device and the carrier. The UE may implement slicing support, which uses application identifiers from network policy (URSP) to routes application traffic to a specific network slice. In some embodiments, the UE implements slice selection according to NSSAI, which is exchanged in a 5G attach-and-register procedure. The NSSAI provides specific network slicing information and expected behavior.

At block 506, the UE monitors usages of the resources and obtains a status of the UE based on the monitored usages. At block 508, the UE communicates with an edge computing resource of the carrier system regarding the status of the UE, so the edge computing resource may adjust to meet the service level requirement for the user device. In some embodiments, the O/M stack can closely monitor what is happening on a device, and communicate that to the edge computing resource and provide instruction on how to tune the service to meet the service level requirement of the UE. The UE may also request access of one or more network slices on behalf of the applications running on the UE and receives acknowledgment from the edge computing resource. The acknowledgment can have very little latency since it is from a computing resource at an edge of the network that is communicatively close to the UE (e.g., near a base station that is accessed by the UE.)

In some embodiments, the UE performs the operations described by reference to the blocks 504, 506, and 508 above by running the O/M stack, or it can be said that the O/M stack performs the operations of the blocks 504, 506, and 508. In some embodiments, a middle layer of the O/M stack performs the policy matching described by reference to block 504 above.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A non-transitory computer-readable storage medium storing a plurality of computer-executable components that are executable by one or more processors to perform a plurality of actions, the plurality of actions comprising:

receiving, at a user device that subscribes to a carrier system, a policy for accessing a plurality of different network slices that are logical networks virtualized on a physical infrastructure of the carrier system; and coordinating access by one or more applications of the user device to different services provided by the plurality of different network slices, the coordinating including identifying a particular operation that an application is requesting to carry out and matching the particular operation to a specific network service that is accessible via a corresponding network slice, wherein the application is allowed access to the corresponding network slice to use the specific network service to perform the particular operation when the application and the user device meet corresponding conditions specified by the received policy for accessing the corresponding network slice, in which the user device meeting a corresponding condition includes a processing unit usage metric or a storage usage metric of the user device meeting the corresponding condition specified by the received policy.

2. The non-transitory computer-readable storage medium of claim 1, wherein the application meeting a corresponding condition includes an identifier of the application being specified by the received policy as having access to the corresponding network slice.

3. The non-transitory computer-readable storage medium of claim 1, wherein the coordinating is performed by an orchestration and mediation stack of the user device.

4. The non-transitory computer-readable storage medium of claim 1, wherein the plurality of actions further comprises:

monitoring the user device and communicating with an edge computing resource of the carrier system regarding a status of the user device for the edge computing resource to adjust to meet a service level requirement for the user device.

5. The non-transitory computer-readable storage medium of claim 4, wherein the plurality of actions further comprises:

requesting access to one or more network slices on behalf of the application and receiving acknowledgment from the edge computing resource.

6. The non-transitory computer-readable storage medium of claim 1, wherein the application of the user device is specified by the received policy to access the corresponding network slice based on a service level requirement of the corresponding network slice.

7. The non-transitory computer-readable storage medium of claim 1, wherein the application of the user device is specified by the received policy to access the corresponding network slice based on a quality of service assigned to a subscriber associated with the user device.

8. The non-transitory computer-readable storage medium of claim 1, wherein an identifier of the application is mapped to the corresponding network slice according to the received policy.

9. A computer implemented method comprising:

providing an orchestration and mediation (O/M) stack that, when installed in a user device that subscribes to a carrier system, configures the user device to perform a plurality of actions, the plurality of actions comprising:

receiving a policy for accessing a plurality of different network slices that are logical networks virtualized on a physical infrastructure of the carrier system; and coordinating access by one or more applications of the user device to different services provided by the plurality of different network slices, the coordinating including identifying a particular operation that an application is requesting to carry out and matching the particular operation to a specific network service that is accessible via a corresponding network slice, wherein the application is allowed access to the corresponding network slice to use the specific network service to perform the particular operation when the application and the user device meet at least one condition specified by the received policy for accessing the corresponding network slice, in which the user device meeting a corresponding condition includes a processing unit usage metric or a storage usage metric of the user device meeting the corresponding condition specified by the received policy.

10. The computer implemented method of claim 9, wherein the coordinating further includes requesting access to the corresponding network slice for the application via the O/M stack on the user device.

11. The computer implemented method of claim 9, wherein the application meeting a corresponding condition includes an identifier of the application being specified by the received policy as having access to the corresponding network slice.

12. The computer implemented method of claim 9, wherein the plurality of actions further comprise:

monitoring the user device and communicating with an edge computing resource of the carrier system regarding a status of the user device for the edge computing resource to adjust to meet a service level requirement for the user device.

13. The computer implemented method of claim 12, wherein the edge computing resource is situated near a base station of the carrier system.

14. The computer implemented method of claim 9, wherein the application of the user device is specified by the received policy to access the corresponding network slice based on a service level requirement of the corresponding network slice.

15. The computer implemented method of claim 9, wherein the application of the user device is specified by the received policy to access the corresponding network slice based on a quality of service assigned to a subscriber associated with the user device.

16. The computer implemented method of claim 9, wherein an identifier of the application is mapped to the corresponding network slice according to the received policy.

17. A system comprising:

a carrier system supporting a plurality of different network slices for providing services to one or more subscribing user devices, each network slice being a logical network virtualized on the carrier system, wherein the carrier system provides a policy to each subscribing user device specifying one or more conditions for allowing a corresponding application running on the each subscribing user device to access a corresponding network slice; and a subscribing user device that includes an orchestration and mediation (O/M) stack, the O/M stack coordinating access by one or more applications running on the subscribing user device to one or more network slices of the carrier system, the coordinating including identifying a particular operation that an application is requesting to carry out and matching the particular operation to a specific network service that is accessible via a corresponding network slice, wherein the application of the subscribing user device is allowed access to the corresponding network slice to use the specific network service to perform the particular operation by the O/M stack when the application and the subscribing user device meet corresponding conditions specified by the policy provided by the carrier system for accessing the corresponding network slice, in which the subscribing user device meeting a corresponding condition includes a processing unit usage metric or a storage usage metric of the subscribing user device meeting the corresponding condition specified by the policy.

18. The system of claim 17, wherein the subscribing user device communicates with an edge computing resource of the carrier system regarding a status of the subscribing user device and the edge computing resource adjusts to meet a service level requirement for the subscribing user device.

19. The system of claim 17, wherein the application meeting a corresponding condition includes an identifier of the application being specified by the policy as having access to the corresponding network slice.

20. The system of claim 17, wherein the application of the subscribing user device is specified by the policy to access the corresponding network slice based on a service level requirement of the corresponding network slice.

\* \* \* \* \*